United States Patent Office 3,655,609
Patented Apr. 11, 1972

3,655,609
BINDER MIXTURE FOR FRICTION ELEMENTS COMPRISING PHENOLIC RESIN AND PRECIPITATED SILICATE
Edward Michael Evans, Penarth, Glamorgan, and Kerry David Jeffreys, Rhiwbina, Cardiff, Wales, assignors to BP Chemicals (U.K.) Limited, London, England
No Drawing. Filed Sept. 30, 1969, Ser. No. 862,497
Claims priority, application Great Britain, Oct. 4, 1968, 47,091/68
Int. Cl. C08g 37/14
U.S. Cl. 260—38                      8 Claims

ABSTRACT OF THE DISCLOSURE

Binder resin compositions for the preparation of friction elements e.g. brake and clutch linings having good hot wear properties comprise from 5 to 95 parts by weight of a phenolic resin and from 95 to 5 parts by weight of a precipitated alkali metal silicate. The resins may be compounded with conventional additives, e.g. asbestos and barytes and moulded under heat and pressure to form friction elements.

---

The present invention is concerned with improved binder resin compositions for the preparation of friction elements, and friction elements prepared therefrom.

Friction elements such as clutch plates and brake linings can be made by bonding a friction material with a resin. Asbestos is commonly used as a friction material, either as a woven fabric or in fibre form. The friction materials are usually bonded with a thermosetting phenolic resin. When such friction elements are subjected to severe brake or clutch operating conditions, the high temperatures produced tend to break down the element with resulting wear and/or loss in frictional properties.

According to the present invention, a binder resin composition suitable for use in the preparation of friction elements having improved hot wear properties, as herein defined, comprises from 5 to 95 parts by dry weight of a phenolic resin and from 95 to 5 parts by dry weight of an alkali metal silicate and an activating precipitant for the alkali metal silicate, as herein defined.

By a friction element having improved hot wear properties is meant throughout this specification a friction element which exhibits a lower weight loss under load at high operating temperatures than a similar friction element compounded from the same phenolic binder resin in the absence of the alkali metal silicate and the precipitant.

Any phenolic resin of the type employed in the manufacture of friction elements can be used according to the present invention. An example of such a resin is one prepared by the reaction of a monohydric or dihydric phenol and an aldehyde under either acid (novolak) or alkaline (resole) conditions. A preferred phenolic resin is one prepared from phenol per se ($C_6H_5OH$) and formaldehyde. However, phenol/aldehyde resins obtained from cresol, xylenol or other alkyl or aralkyl substituted phenols, resorcinol or cashew nut-shell liquid as all or part of the phenol and furfuraldehyde as all or part of the aldehyde can be employed. The phenolic resin may be modified by known methods with natural or synthetic rubbers or fatty oils or fatty acids and is mixed with curing agents such as for example hexamine and paraform as necessary.

The preferred alkali metal silicate is sodium silicate.

The relative proportions of the phenolic resin and the alkali metal silicate in the binder resin compositions can vary widely to give the desired balance between hot and cold wear properties and frictional properties of the friction elements obtained from the binder resin compositions. Particularly useful binder resin compositions are obtained using 65 to 35 parts by dry weight of phenolic resin to 35 to 65 parts by dry weight of alkali metal silicate.

Chemicals that precipitate an alkali metal silicate from solution in a finely divided form are well known. Such chemicals are discussed in "A Comprehensive Treatise on Inorganic and Theoretical Chemistry" vol. VI by J. W. Mellor (Longmans, Green and Company, London, 1957) at page 291 et seq. By an activating precipitant is meant throughout this specification a chemical that precipitates an alkali metal silicate from solution and satisfies the following test. When present in a phenolic binder resin composition containing an alkali metal silicate it causes friction elements made therefrom to have greater hot wear resistance than similar friction elements compounded from the same phenolic resin in the absence of the alkali metal silicate and the precipitant, the relative quantities of the components in the test being:

Phenolic resin—15 parts by dry weight
Alkali metal silicate—11 parts by dry weight
Precipitant—4 parts by weight
Asbestos—37 parts by weight
Barytes—33 parts by weight, and the alkali metal silicate and the precipitant being replaced by 8 parts of asbestos and 7 parts of barytes in the comparative friction element.

Suitable activating precipitants are ammonium chloride, ammonium dihydrogen phosphate, ammonium ortho-phosphate, aluminium sulphate, aluminium oxide, hydrated alumina, boric acid, calcium hydroxide, ferric chloride, hydrochloric acid, sodium bicarbonate, zinc chloride and Hydracrete portland cement. A mixture of equal parts by weight of ammonium chloride and calcium hydroxide is also a suitable activating precipitant.

When using sodium silicate it has been found that ammonium chloride is a particularly effective activating precipitant.

It is preferred to employ an amount of activating precipitant sufficient to cause substantially complete precipitation of the alkali metal silicate from an aqueous solution thereof. It is usually unnecessary to employ a weight of activating precipitant greater than the weight of alkali metal silicate although in many cases any excess precipitant acts as filler in the final friction element without any deleterious effect on the properties thereof.

Suitable friction materials for use in composite friction elements prepared from the binder resin compositions of the present invention are the materials well known in the art, such as asbestos. The compositions may be further modified by the incorporation of known fillers such as for example barytes, metal filings, rubber, organic friction particles and graphite. However, it has been found that certain known fillers e.g. magnesium oxide, interfere with the action of certain activating precipitants, e.g. calcium hydroxide and, therefore, the choice of fillers will depend to some extent on the precipitant used, in order that friction elements having the desired properties are obtained.

The binder resin compositions of the present invention can be prepared by dry or wet mixing of the necessary components. Conveniently this blending can be carried out at the same time and in the same blender as the mixing of the friction materials in the fabrication of the friction elements.

The friction elements can be made by the known processes for bonding friction materials with resins. For example, the resin can be dry mixed with asbestos and the mix moulded under pressure with heat, or a solution of the resin can be used to impregnate asbestos by the wet mix dough process, the solvent being dried off prior to moulding. Suitably a pressure of at least 1 ton/square inch and a temperature of at least 150° C. should be used in the moulding process.

The invention is further illustrated with reference to the following examples.

The results are shown in Table 1 and comparison of the hot wear performance of compositions 2, 4 and 6, containing the alkali metal silicate/activating precipitant system of the present invention with compositions 1, 3 and 5 without an alkali metal silicate, and composition 7 (Example 2) without an activating precipitant readily shows the improvement in hot wear obtained by using the binder resin compositions of the present invention.

TABLE 1

| | | | Disc pad composition | | | | | | Dynamometer test results | | | |
|---|---|---|---|---|---|---|---|---|---|---|---|---|
| | | | | Parts of— | | | | | Loss in weight, grams | | Friction level before fade at— | |
| Composition Number | Resin Number | Type of resin | Resin [1] | Sodium silicate | Ammonium chloride | Silica | 5R asbestos | Barytes | Cold wear | Hot wear | 30 m.p.h. | 60 m.p.h. |
| 1 | [2] Cellobond J101/97 | Phenol resole | 15 | | | 15 | 37 | 33 | 7.010 | 9.622 | 0.202 | 0.184 |
| 2 | do | do | 15 | 11 | 4 | | 37 | 33 | 1.063 | 3.008 | 0.30 | 0.25 |
| 3 | Cellobond J615 | Phenol novolak with hexamine. | 15 | | | | 45 | 40 | 1.200 | 12.884 | 0.305 | 0.26 |
| 4 | do | do | 15 | 11 | 4 | | 37 | 33 | 0.886 | 3.680 | 0.236 | 0.22 |
| 5 | Cellobond J960/644 | Elastomer modified novolak with hexamine. | 15 | | | | 45 | 40 | 1.450 | 13.110 | 0.29 | 0.24 |
| 6 | do | do | 15 | 11 | 4 | | 37 | 33 | 0.750 | 7.591 | 0.25 | 0.20 |

[1] Parts given are parts by dry weight of components. In these compositions the total parts of ingredients add to 100. The organic resin content of the system is maintained at 15 parts throughout, the inorganic content to 85 parts (the ratio of asbestos to barytes also being kept constant).
[2] Cellobond is a registered trademark of B.P. Chemicals (U.K.) Limited.

EXAMPLE 1

Six compositions, 3 as controls and 3 according to the present invention were prepared from various phenolic resins and fabricated into disc pads.

An aqueous sodium silicate solution was used which had a specific gravity of 1.50, but quantities are expressed as parts by dry weight of the ingredients.

The procedure for the preparation of the moulded disc pads was as follows. Wet mixes were prepared by blending the ingredients in a Z-blade mixer, sufficient water or industrial methylated spirit being added to give good wetting and mixing. The wet mixes were dried at 75° C., the drying time being dependent on the time required to give optimum flow of the component under moulding conditions.

The dry compositions were all moulded at a temperature of 160° C. and a pressure of 1 ton/sq. in. for 10 minutes with breathing for 15 seconds 1½ minutes after the application of full pressure. Post stoving of the moulded pads was carried out for 16 hours at 150° C.

The pads were tested on an inertia dynamometer with a proprietary disc brake assembly. The inertia of the machine was set to simulate the energy produced by a medium weight family saloon. Cold Wear testing was carried out over 100 stops at a temperature of 80 to 120° C., whilst the Hot Wear was measured over 15 stops with a temperature range as measured by a thermocouple embedded in the centre of the disc, of 150° C. to 650° C.

EXAMPLE 2

A further series of compositions were prepared by the method of Example 1, to show the use of various other activating precipitants. The base phenolic resin used was the hexamine cured phenolic novolak Cellobond J 615 used in compositions 3 and 4 of Example 1. The compositions were fabricated into disc brake pads and tested by the same procedure described in Example 1. The results are shown in Table 2, from which it may be seen that all the disc pad compositions 8–18 containing sodium silicate and an activating precipitant show an improvement in hot wear over a composition 7 in which no precipitant was present, and composition 3 of Example 1 in which the straight resin was used.

Comparison of the test results on composition number 3 of Example series 1 and on composition number 7 of Example series 2 shows that the presence of the alkali metal silicate in the composition reduces the hot wear resistance of the formed friction element. However, the presence of an activating precipitant causes a marked increase in the hot wear resistance of the formed friction elements.

TABLE 2

| | | Disc pad composition | | | | | | Dynamometer test, hot wear (loss in weight in grams) |
|---|---|---|---|---|---|---|---|---|
| Composition Number | Resin number | Type of resin | Parts of resin | Parts of sodium silicate | Precipitating agent (4 parts by weight) | Asbestos | Barytes | |
| 7 | Cellobond J615. | Phenol novolak with hexamine. | 15 | 11 | None | 37 | 33 | 17.80 |
| 8 | do | do | 15 | 11 | Ammonium dihydrogen phosphate | 37 | 33 | 9.57 |
| 9 | do | do | 15 | 11 | Ammonium orthophosphate | 37 | 33 | 9.45 |
| 10 | do | do | 15 | 11 | Aluminium oxide | 37 | 33 | 4.60 |
| 11 | do | do | 15 | 11 | Hydrated alumina | 37 | 33 | 5.33 |
| 12 | do | do | 15 | 11 | Aluminium sulphate | 37 | 33 | 10.35 |
| 13 | do | do | 15 | 11 | Boric acid | 37 | 33 | 11.62 |
| 14 | do | do | 15 | 11 | Calcium hydroxide | 37 | 33 | 9.26 |
| 15 | do | do | 15 | 11 | Ferric chloride | 37 | 33 | 4.16 |
| 16 | do | do | 15 | 11 | Concentrate hydrochloric acid | 37 | 33 | 9.50 |
| 17 | do | do | 15 | 11 | "Hydracrete" portland cement | 37 | 33 | 7.3 |
| 18 | do | do | 15 | 11 | Zinc chloride | 37 | 33 | 5.1 |

NOTE.—Compositions 7–18 were wet mixed using sodium silicate solution (S.G. 1.50). All proportions are in parts by dry weight.

EXAMPLE 3

A further four compositions were prepared by a dry mixing technique wherein Cellobond J615 phenolic resin (15 parts by dry weight), sodium silicate (11 parts by dry weight) and activating precipitant (4 parts by dry weight) were blended until an intimate mixture was obtained and then asbestos (37 parts by weight) and barytes (33 parts by weight) were blended in. Disc pads were then fabricated from the compositions by the method described in Example 1.

The pads were tested to determine their hot wear properties, and the results obtained are shown in Table 3.

ed with (b) a thermoset binder resin composition comprising an intimate mixture of from about 5 to 95 parts by dry weight of a thermosettable phenolic resin which has been thermoset in the presence of from about 95 to 5 parts by dry weight of an alkali metal silicate and an activating precipitant for the alkali metal silicate which increases the hot wear resistance of the friction element.

TABLE 2

| Composition Number | Resin number | Type of resin | Parts of resin | Parts of sodium silicate | Precipitating agent (4 parts by weight) | Asbestos | Barytes | Dynamometer test, hot wear (loss in weight in grams) |
|---|---|---|---|---|---|---|---|---|
| 19 | Cellobond J615. | Phenol novolak with hexamine. | 15 | 11 | Ammonium chloride | 37 | 33 | 4.36 |
| 20 | do | do | 15 | 11 | {Ammonium chloride (2) Calcium hydroxide (2)} | 37 | 33 | 5.06 |
| 21 | do | do | 15 | 11 | Calcium hydroxide | 37 | 33 | 5.0 |
| 22 | do | do | 15 | 11 | Sodium hydrogen carbonate | 37 | 33 | 11.74 |

All proportions are in parts by dry weight.

We claim:

1. A binder resin composition for use in the preparation of friction elements having improved hot wear properties, which comprises an intimate mixture of from about 5 to 95 parts by dry weight of a thermosettable phenolic resin and from about 95 to 5 parts by dry weight of an alkali metal silicate and an activating precipitant for the alkali metal silicate which increases the hot wear resistance of friction elements made from the binder resin.

2. A binder resin composition as claimed in claim 1 wherein the alkali metal silicate is sodium silicate.

3. A binder resin composition as claimed in claim 1 wherein the thermosettable phenolic resin is prepared from phenol ($C_6H_5OH$) and formaldehyde.

4. A binder resin composition as claimed in claim 1 wherein the thermosettable phenolic resin is a novolak resin.

5. A binder resin composition as claimed in claim 1 wherein the thermosettable phenolic resin is a resole resin.

6. A composition as claimed in claim 1 wherein the precipitant is selected from the group consisting of ammonium chloride, ammonium dihydrogen phosphate, ammonium orthophosphate, aluminium oxide, hydrated alumina, aluminium sulphate, boric acid, calcium hydroxide, ferric chloride, concentrated hydrochloric acid, zinc chloride and Hydracrete Portland cement.

7. A friction element suitable for use as a brake or clutch lining having improved hot wear properties, which comprises (a) a major amount of a friction material bond- 8. A friction element suitable for use as a brake or clutch lining having improved hot wear properties, which comprises (a) a major amount of asbestos bonded with (b) a thermoset binder resin composition comprising an intimate mixture of from about 5 to 95 parts by dry weight of a thermosettable phenolic resin which has been thermoset in the presence of from about 95 to 5 parts by dry weight of an alkali metal silicate and an activating precipitant selected from the group consisting of ammonium chloride, ammonium dihydrogen phosphate, ammonium orthophosphate, aluminium oxide, hydrated alumina, aluminium sulphate, boric acid, calcium hydroxide, ferric chloride, concentrated hydrochloric acid, zinc chloride and Hydracrete Portland cement.

References Cited
UNITED STATES PATENTS 3,326,843  6/1967  Barnett et al. _____ 260—38
2,536,871  1/1951  Carlton _____ 260—38 X

OTHER REFERENCES

J. W. Mellor, A Comprehensive Treatise on Inorganic and Theoretical Chemistry, vol. VI, Longmans, Green and Co., London (1957) Sci. Libr.: QD31M4, pp. 290–4.

MORRIS LIEBMAN, Primary Examiner

S. M. PERSON, Assistant Examiner

U.S. Cl. X.R.

106—36, 83; 188—251 R, 251 A; 192—107 M